US008902981B2

(12) United States Patent
Sagata et al.

(10) Patent No.: US 8,902,981 B2
(45) Date of Patent: Dec. 2, 2014

(54) VIDEO SIGNAL GENERATION APPARATUS, VIDEO SIGNAL GENERATION METHOD, VIDEO SIGNAL GENERATION PROGRAM, AND COMPUTER READABLE RECORDING MEDIUM RECORDING THE PROGRAM

(75) Inventors: Atsushi Sagata, Yokosuka (JP); Mitsuo Ikeda, Yokosuka (JP); Hiroaki Matsuda, Yokosuka (JP); Jirou Naganuma, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1075 days.

(21) Appl. No.: 12/673,095

(22) PCT Filed: Aug. 27, 2008

(86) PCT No.: PCT/JP2008/065295
§ 371 (c)(1),
(2), (4) Date: Feb. 11, 2010

(87) PCT Pub. No.: WO2009/028549
PCT Pub. Date: Mar. 5, 2009

(65) Prior Publication Data
US 2011/0122948 A1 May 26, 2011

(30) Foreign Application Priority Data

Aug. 27, 2007 (JP) ................................. 2007-219199

(51) Int. Cl.
*H04N 7/12* (2006.01)
(Continued)

(52) U.S. Cl.
CPC ... *H04N 19/00472* (2013.01); *H04N 19/00533*
(Continued)

(58) Field of Classification Search
CPC .................. H04N 19/00315; H04N 19/00533; H04N 19/00545
USPC ........... 348/607; 375/240.03, 240.13, 240.15, 375/240.25, 240.12; 382/166; 726/30
See application file for complete search history.

(56) References Cited

U.S. PATENT DOCUMENTS

2007/0147503 A1  6/2007 Ikeda et al.
2007/0263724 A1* 11/2007 Cote et al. ................ 375/240.15
(Continued)

FOREIGN PATENT DOCUMENTS

CN  101014132 A  8/2007
EP  1 069 779 A1  1/2001
(Continued)

OTHER PUBLICATIONS

Search Report issued Sep. 3, 2010, in European Patent Application No. 08828861.8-1247/2182733.
(Continued)

*Primary Examiner* — Jessica M Prince
*Assistant Examiner* — Richard Carter
(74) *Attorney, Agent, or Firm* — Oblon, Spivak, McClelland, Maier & Neustadt, L.L.P.

(57) ABSTRACT

A video signal generation apparatus for decoding a bit stream to generate a video signal, includes: a writing unit configured to write a flag value indicating whether a decoding target block has been coded by intra-coding or inter-coding in a specified bit position on one bit plane having a size the same as that of the decoding target block, to write information indicating a coding division form of the decoding target block in a specified common area on the one bit plane, and to write the coding information in a specified switch interpretation area on the one bit plane according to a data format conforming to the intra-coding if the decoding target block has been coded by intra-coding, and to write the coding information in the specified switch interpretation area according to a data format conforming to the inter-coding if the decoding target block has been coded by inter-coding; and a generation unit configured to generate a video signal by superimposing the one bit plane on a decoded image of the decoding target block.

12 Claims, 8 Drawing Sheets

(51) Int. Cl.
  *H04N 11/02* (2006.01)
  *H04N 19/44* (2014.01)
  *H04N 19/186* (2014.01)
  *H04N 19/70* (2014.01)
  *H04N 19/46* (2014.01)
  *H04N 19/176* (2014.01)
  *H04N 19/40* (2014.01) (2013.01);

(52) U.S. Cl.
  CPC .. *H04N 19/00315* (2013.01); *H04N 19/00884* (2013.01); *H04N 19/00545* (2013.01); *H04N 19/00278* (2013.01)
  USPC .................................................. 375/240.13

(56) References Cited

U.S. PATENT DOCUMENTS

| | | | |
|---|---|---|---|
| 2008/0123947 A1* | 5/2008 | Moriya et al. | 382/166 |
| 2008/0278630 A1* | 11/2008 | Kimura et al. | 348/607 |
| 2010/0091843 A1* | 4/2010 | Jeon et al. | 375/240.12 |
| 2010/0202521 A1* | 8/2010 | Koo et al. | 375/240.13 |
| 2010/0316135 A1* | 12/2010 | Jeon et al. | 375/240.25 |
| 2012/0114035 A1* | 5/2012 | Nakagomi et al. | 375/240.03 |
| 2013/0055413 A1* | 2/2013 | Ghosal et al. | 726/30 |

FOREIGN PATENT DOCUMENTS

| | | |
|---|---|---|
| EP | 1 081 957 A1 | 3/2001 |
| EP | 1 855 484 A2 | 11/2007 |
| EP | 1 855 484 A3 | 11/2007 |
| JP | 2002 165223 | 6/2002 |
| JP | 2007 180776 | 7/2007 |
| KR | 10-2007-0069073 | 7/2007 |
| WO | WO 98/03017 | 1/1998 |

OTHER PUBLICATIONS

SMPTE 319M, "Transporting MPEG-2 Recording Information Through 4:2:2 Component Digital Interfaces", SMPTE Journal, pp. 141-146 (Feb. 2000).
SMPTE 327M, "MPEG-2 Video Recording Data Set", SMPTE Journal, pp. 146-150 (Feb. 2000).
SMPTE 328M, "MPEG-2 Video Elementary Stream Editing Information", SMPTE Journal, pp. 151-154 (Feb. 2000).
SMPTE 329M, "MPEG-2 Video Recording Data Set—Compressed Stream Format", SMPTE Journal, pp. 155-161 (Feb. 2000).
Korean Office Action issued Jun. 3, 2011, in Patent Application No. 10-2010-7002724.
Office Aciton issued Jun. 15, 2011 in Chinese Patent Application No. 200880103060.9.

* cited by examiner

FIG.4

| IN MB | | |
|---|---|---|
| 0 | FIXED CODE FOR SYNCHRONIZATION | RESERVED CODE (EXTENSION AREA) 0 |
| 1 | MACROBLOCK CYCLIC NUMBER | |
| 2 | PICTURE CODING INFORMATION DESCRIBING AREA | |
| 3 | SLICE CODING INFORMATION DESCRIBING AREA | |
| 4 | | |
| 5 | SLICE CYCLIC NUMBER | SLICE TYPE (1) |
| 6 | (2) BLOCK TYPE | BIDIRECTIONAL PREDICTION FLAG |
| 7 | UNUSED | |
| 8 | (INTRA COLOR DIFFERENCE PREDICTION MODE) | |
| 9 | | |
| 10 | INTRA TYPE | |
| 11 | INTRA-PREDICTION MODE [0] / INTRA-PREDICTION MODE [1] / INTRA-PREDICTION MODE [2] / INTRA-PREDICTION MODE [3] |
| 12 | INTRA-PREDICTION MODE [4] / INTRA-PREDICTION MODE [5] / INTRA-PREDICTION MODE [6] / INTRA-PREDICTION MODE [7] |
| 13 | INTRA-PREDICTION MODE [8] / INTRA-PREDICTION MODE [9] / INTRA-PREDICTION MODE [10] / INTRA-PREDICTION MODE [11] |
| 14 | INTRA-PREDICTION MODE [12] / INTRA-PREDICTION MODE [13] / INTRA-PREDICTION MODE [14] / INTRA-PREDICTION MODE [15] |
| 15 | ERROR CORRECTION CRC CODE | |

FIG.5

| IN MB | | | | | | |
|---|---|---|---|---|---|---|
| 0 | FIXED CODE FOR SYNCHRONIZATION | RESERVED CODE (EXTENSION AREA) | | | | 0 |
| 1 | MACROBLOCK CYCLIC NUMBER | | | | | |
| 2 | PICTURE CODING INFORMATION DESCRIBING AREA | | | | | |
| 3 | SLICE CODING INFORMATION DESCRIBING AREA | | | | | |
| 4 | | | | | | |
| 5 | SLICE CYCLIC NUMBER | | | SLICE TYPE | (1) | |
| 6 | (2) | BLOCK TYPE | | | | BIDIRECTIONAL PREDICTION FLAG |
| 7 | SWITCH INTERPRETATION AREA A | | | | | |
| 8 | | | | | | |
| 9 | SWITCH INTERPRETATION AREA B | | | | | |
| 10 | | | | | | |
| 11 | SWITCH INTERPRETATION AREA C | | | | | |
| 12 | | | | | | |
| 13 | SWITCH INTERPRETATION AREA D | | | | | |
| 14 | | | | | | |
| 15 | ERROR CORRECTION CRC CODE | | | | | |

FIG.6B

| PREDICTION DIRECTION | REFERENCE IMAGE NUMBER OF FORWARD PREDICTION | REFERENCE IMAGE NUMBER OF BACKWARD PREDICTION | HORIZONTAL DIRECTION MOTION VECTOR OF FORWARD PREDICTION |
|---|---|---|---|
| VERTICAL DIRECTION MOTION VECTOR OF FORWARD PREDICTION | HORIZONTAL DIRECTION MOTION VECTOR OF BACKWARD PREDICTION | VERTICAL DIRECTION MOTION VECTOR OF BACKWARD PREDICTION | |

FIG.6C

| PREDICTION DIRECTION | REFERENCE IMAGE NUMBER OF FORWARD PREDICTION | REFERENCE IMAGE NUMBER OF BACKWARD PREDICTION | |

VIDEO SIGNAL GENERATION APPARATUS, VIDEO SIGNAL GENERATION METHOD, VIDEO SIGNAL GENERATION PROGRAM, AND COMPUTER READABLE RECORDING MEDIUM RECORDING THE PROGRAM

TECHNICAL FIELD

The present invention relates to a video signal generation apparatus and the method for generating a video signal by decoding a bit stream of video coded data generated by intra-coding and inter-coding, and relates to a video signal generation program and a computer readable recording medium recording the program which are used for realizing the video signal generation apparatus. More particularly, the present invention relates to a video signal generation apparatus and the method for enabling to transmit coding information of large data amount which occurs when performing encoding by using H.264 and the like with a decoded video signal by using a Mole format similarly to MPEG-2, and relates to a video signal generation program and a computer readable recording medium recording the program which are used for realizing the video signal generation apparatus.

BACKGROUND ART

There is a need for recoding a decoded video signal. In this case, it is known that, if an encoder of a latter stage performs coding by using a coding parameter that has been used by an encoder of a former stage, little or no image quality deterioration occur.

Then, when there is the need for recoding the decoded video signal, coding information (information of the coding parameter) that has been used by the encoder of the former stage is superimposed on the decoded video signal.

For realizing this processing, in the Mole format of the conventional MPEG-2 (SMPTE standard), processing is performed such that, for each macro block, coding information of the macro block is embedded into 1 bit of LSB of the color-difference component of the video signal at a corresponding timing (refer to non-patent document 1, for example).

The existing video transmission interface such as HD-SDI and SD-SDI performs 10-bit transmission. So, 2 bits can be used when transmitting an 8-bit video signal. Thus, in the Mole format of the conventional MPEG-2 (SMPTE standard), a plane of 1 bit (1 bit of LSB) of the 2 bits is used, so that the coding information of the macroblock is embedded into 16×16=256 bits of the plane.

According to this configuration, the coding information of MPEG-2 can be transmitted together with the video signal at a rate no more than 256 bits/macroblock.

[Non-patent document 1] SMPTE 319M "Transporting MPEG-2 Recoding Information through 4:2:2 Component Digital Interfaces" SMPTE Journal, February 2000.

DISCLOSURE OF THE INVENTION

Problem to be Solved by the Invention

Also when decoding a video signal coded by H.264, there is a need for recoding the decoded video signal. But, in H.264, there has been no standard like the SMPTE standard of MPEG-2.

In MPEG-2, if 256 bits are assigned per 1 macroblock as a recording area of the coding information, it is sufficiently possible to represent coding information of each macroblock.

On the other hand, since H.264 has a plurality of coding mode for each macroblock, the amount of information such as coding types of various macroblocks, division information of macroblock, and the number of motion vectors is much greater than that of MPEG-2.

Therefore, in the case of H.264, coding information of 1 macroblock cannot be represented by 256 bits per 1 macroblock.

However, it is not preferable to provide a H.264 proprietary standard. The reason is that, if the H.264 proprietary standard is provided, there is a possibility that video devices which are currently used become unusable.

The present invention is contrived in view of the above-mentioned matters, and an object is to provide a new video signal generation technique which enables to transmit coding information of large data amount occurring when performing coding by H.264 and the like with a decoded video signal by using the Mole format the same as one for MPEG-2.

Means for Solving the Problem

In order to achieve the object, a video signal generation apparatus of the present invention adopts a configuration for receiving a bit stream of video coded data generated by intra-coding and inter-coding, and decoding the bit stream in units of blocks each having a specified size to generate a video signal, and the video signal generation apparatus includes:

(1) a decoding unit configured to decode coding information for a decoding target block included in the bit stream;

(2) a writing unit configured to write, based on the coding information decoded by the decoding unit, a flag value indicating whether the decoding target block has been coded by intra-coding or inter-coding in a specified bit position on one bit plane having a size the same as that of the decoding target block, to write information indicating a coding division form of the decoding target block in a specified common area on the one bit plane, and to write the coding information in a specified switch interpretation area on the one bit plane according to a data format conforming to the intra-coding if the decoding target block has been coded by intra-coding, and to write the coding information in the specified switch interpretation area according to a data format conforming to the inter-coding if the decoding target block has been coded by inter-coding; and (3) a generation unit configured to generate a video signal by superimposing the one bit plane, on which the flag value and the coding information are written by the writing unit, on a decoded image of the decoding target block.

When adopting the above-mentioned configuration, if data amount of the coding information becomes large according to the coding division form of the decoding target block so that the coding information cannot be accommodated in the switch interpretation area, the writing unit writes the coding information from which a part of it is omitted into the switch interpretation area according to a data format conforming to the coding division form.

In addition, the writing unit writes a part of coding information of a picture to which the decoding target block belongs in the common area.

Each of the above-mentioned processing units can be also realized by a computer program. The computer program can be recorded in a proper computer readable recording medium and can be provided as the recording medium, and also the computer program can be provided via a network. The program is installed when carrying out the present invention, so that the program operates on a control unit such as a CPU to realize the present invention.

The video signal generation apparatus of the present invention configured like this receives a bit stream of video coded data, and decodes coding information for a decoding target block included in the bit stream.

When it is determined that the decoding target block has been coded by intra-coding based on the decoding of the coding information, the video signal generation apparatus writes a flag value indicating that the decoding target block has been coded by intra-coding in a specified bit position on one bit plane having a size the same as that of the decoding target block, writes information indicating a coding division form of the decoding target block in a specified common area on the one bit plane, and writes the coding information in a specified switch interpretation area on the one bit plane according to a data format conforming to the intra-coding.

Then, the video signal generation apparatus generates a video signal by superimposing the one bit plane, on which the flag value and the coding information are written, on a decoded image of the decoding target block.

On the other hand, when it is determined that the decoding target block has been coded by inter-coding based on the decoding of the coding information, the video signal generation apparatus writes a flag value indicating that the decoding target block has been coded by inter-coding in a specified bit position on one bit plane having a size the same as that of the decoding target block, writes information indicating a coding division form of the decoding target block in a specified common area on the one bit plane, and writes the coding information in a specified switch interpretation area on the one bit plane according to a data format conforming to the inter-coding.

In this case, when data amount of the coding information becomes large according to the coding division form of the decoding target block so that the coding information cannot be accommodated in the switch interpretation area, the video signal generation apparatus writes the coding information from which a part of it is omitted into the switch interpretation area according to a data format conforming to the coding division form.

Then, the video signal generation apparatus generates a video signal by superimposing the one bit plane, on which the flag value and the coding information are written, on a decoded image of the decoding target block.

Accordingly, for decoding the video signal coded by H.264 and the like and superimposing coding information on the decoded video signal, the video signal generation apparatus of the present invention embeds coding information into one bit of LSB of the color difference component of the video signal, so as to enable transmission using existing video transmission interfaces such as HD-SDI and SD-SDI.

In this case, when the video signal is coded by H.264 and the like, data amount of coding information becomes large. So, all of the coding information cannot be written into the one bit plane having a size of 16×16=256 bits. Thus, a writing area of a flag value is provided for indicating whether the decoding target block has been coded by intra-coding or by inter-coding, and a switch interpretation area is provided for writing coding information according to a data format conforming to intra-coding if the decoding target block has been coded by intra-coding, and for writing coding information according to a data format conforming to inter-coding if the decoding target block has been coded by inter-coding. By providing the areas, it becomes possible to write coding information as much as possible.

Effect of the Invention

According to the present invention, it becomes possible to transmit coding information of large data amount, occurring when coding of H.264 and the like is performed, together with a decoded video signal by using the Mole format similarly to MPEG-2.

Thus, according to the present invention, when there is a need for recoding a decoded signal of a video signal coded by H.264, coding information necessary for recoding can be transmitted with the decoded video signal by using an existing video transmission interface such as HD-SDI and SD-SDI.

BRIEF DESCRIPTION OF THE DRAWINGS

FIG. 4 is an explanatory diagram for explaining the H.264 coding information format generated by the video decoding apparatus of the present invention;

FIG. 5 is an explanatory diagram for explaining the H.264 coding information format generated by the video decoding apparatus of the present invention;

FIG. 6B is an explanatory diagram for explaining the H.264 coding information format generated by the video decoding apparatus of the present invention; and FIG. 6C is an explanatory diagram for explaining the H.264 coding information format generated by the video decoding apparatus of the present invention.

Figure 1:
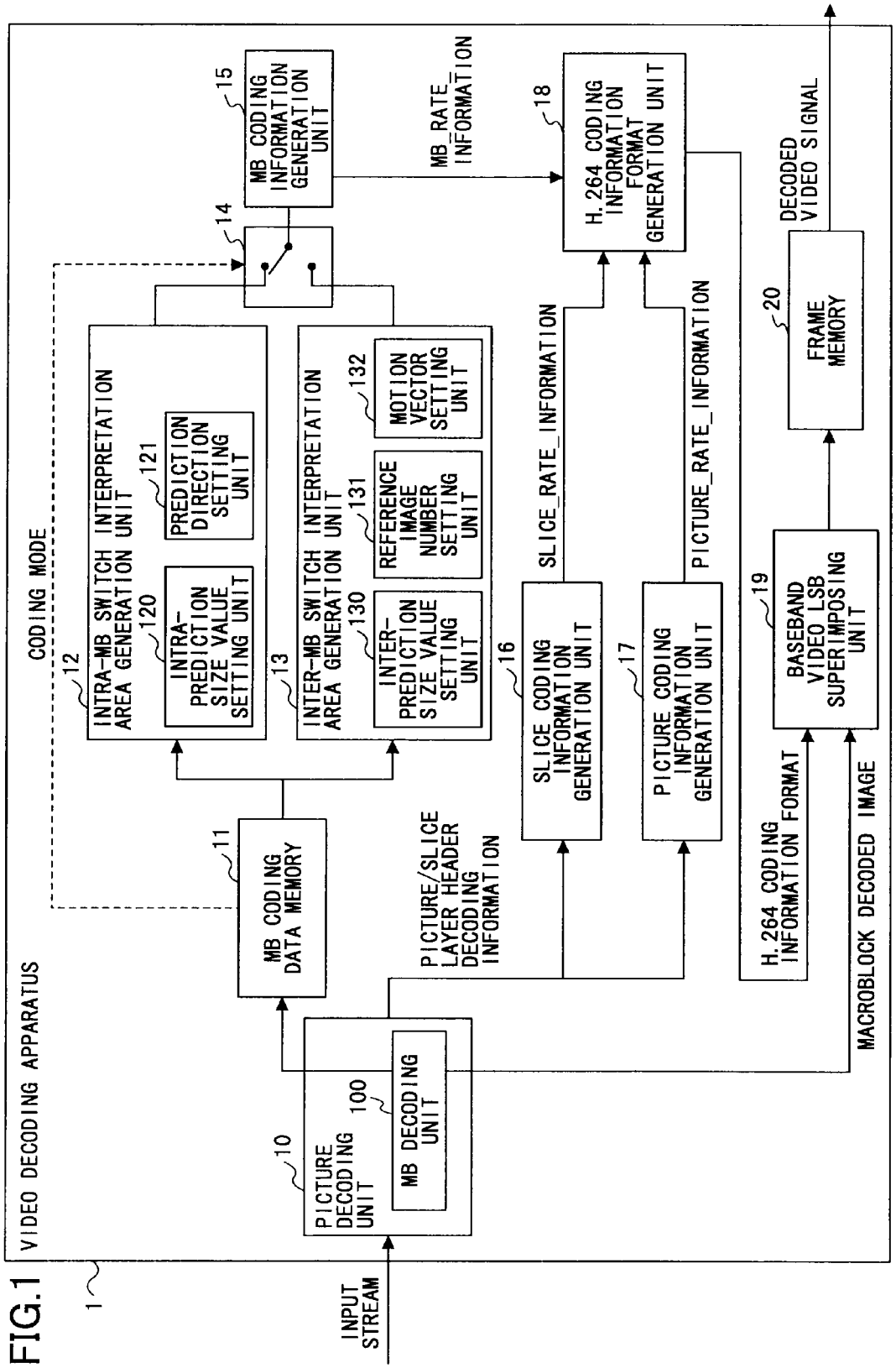
FIG. 1 shows an embodiment of a video decoding apparatus of the present invention.

DESCRIPTION OF REFERENCE SIGNS 1 video decoding apparatus
10 picture decoding unit
11 macroblock coding data memory
12 intra-macroblock switch interpretation area generation unit
13 inter-macroblock switch interpretation area generation unit
14 switch
15 macroblock coding information generation unit
16 slice coding information generation unit
17 picture coding information generation unit
18 H.264 coding information format generation unit
19 baseband video LSB superimposing unit
20 frame memory
120 intra-prediction size value setting unit
121 prediction direction setting unit
130 inter-prediction size value setting unit
131 reference image number setting unit
132 motion vector setting unit

PREFERRED EMBODIMENTS FOR CARRYING OUT THE INVENTION

In the following, the present invention is described in detail according to embodiments.

FIG. 1 shows an embodiment of a video decoding apparatus 1 including the present invention.

The video decoding apparatus 1 of the present invention receives a bit stream of video coded data generated by an H.264 encoder in the former stage which is not shown in the figure, and decodes the bit stream to obtain a decoded video signal. In addition to that, in order to recode the decoded video signal, the video decoding apparatus 1 superimposes coding information (that may be referred to as H.264 coding information hereinafter), that has been used for coding by the H.264 encoder in the former stage, on a place of LSB of the color difference component of the decoded video signal in units of macroblocks.

Figure 2:
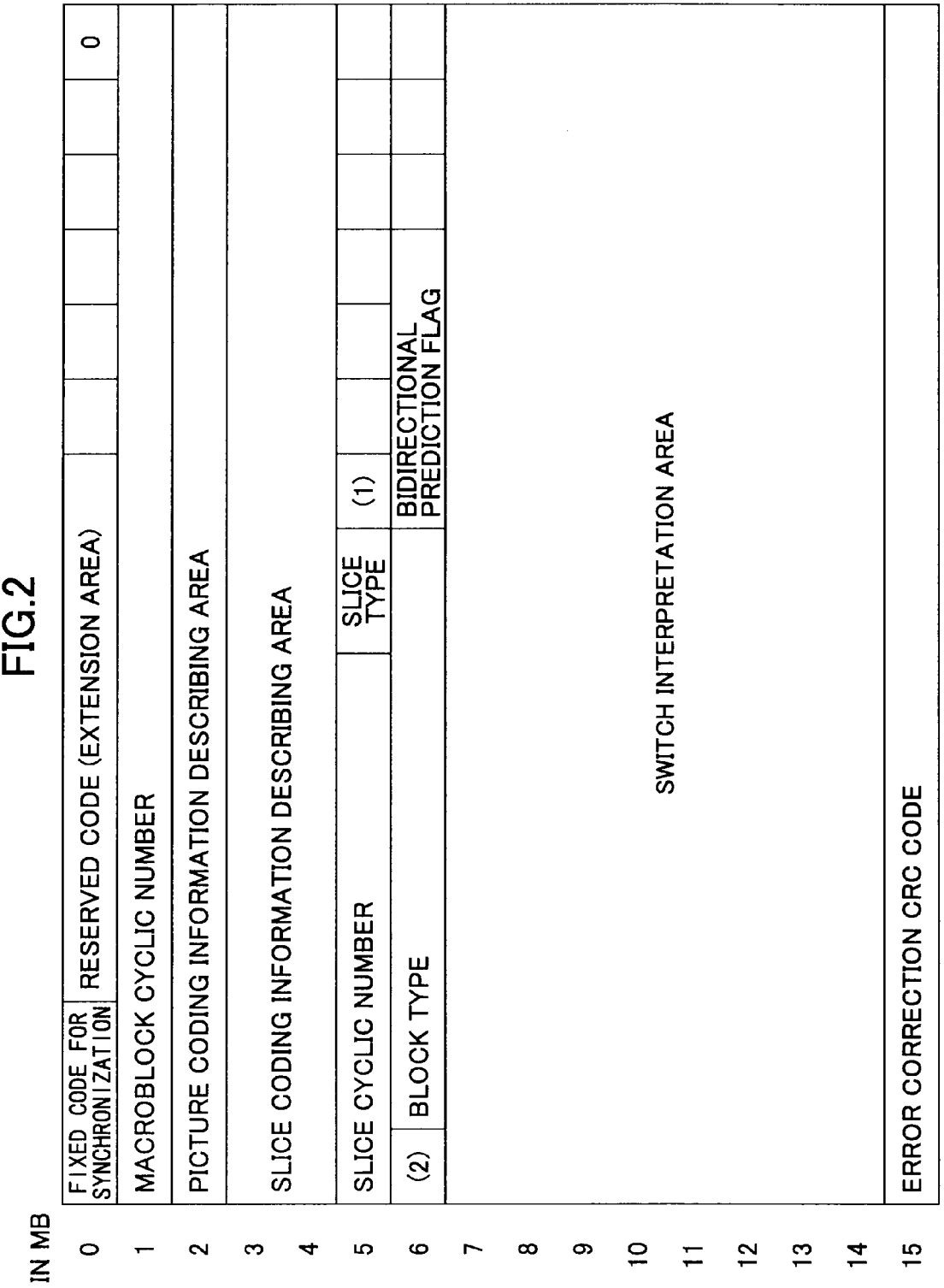
FIG. 2 is an explanatory diagram for explaining an H.264 coding information format generated by the video decoding apparatus of the present invention.

FIG. 2 shows an example of a H.264 coding information format that is to be superimposed on the decoded video signal by the video decoding apparatus 1 of the present invention.

The H.264 coding information format shown in the figure is written into the plane of LSB of the color difference component of the decoded video signal having a size of 16×16=256 bits. Following pieces of information are described in the H.264 coding information format.

(1) Fixed code for synchronization having a value of "11111";

(2) Macroblock cyclic number that is assigned to the macroblock while being incremented one-by-one in order from upper left in the screen to indicate a position of the macroblock in the screen;

(3) Picture coding information describing area for describing coding information assigned to the macroblock among all pieces of information which become picture coding information if the all pieces of information of Picture coding information describing area for all macroblocks in the picture are added;

(4) Slice coding information describing area for describing coding information assigned to the macroblock among all pieces of information which become slice coding information if the all pieces of information of Slice coding information describing area for all macroblocks in the picture are added;

(5) Slice type for describing slice coding types (I-Slice, P-Slice, B-Slice) of the macroblock;

(6) Macroblock intra-code (indicated by (1) in the figure) for describing whether the macroblock is intra-coded or inter-coded;

(7) Block division unit flag (indicated by (2) in the figure) for describing a size of each block re-divided from the macroblock;

(8) Block type for describing a block type of the re-divided block, (9) Bidirectional prediction flag for describing whether coding is performed by bidirectional prediction or unidirectional prediction on 16×16 or 8×8 block; and

(10) Switch interpretation area in which, if the Macroblock intra-code indicates intra-coding, coding information of intra-coding is described, and if the Macroblock intra-code indicates inter-coding, coding information of inter-coding is described.

When the Block division unit flag indicates "0", it describes re-division into block of 16×16, 16×8 or 8×16, and when the Block division unit flag indicates "1", it describes re-division into block of 8×8 or into a block smaller than that.

When the Block division unit flag indicates "0", when the top two bits of the Block type indicate "00", it describes re-division into 1 block of 16×16, when the top two bits indicate "01", it describes re-division into two blocks of horizontal 16×vertical 8, and when the top two bits indicate "10", it describes re-division into two blocks of horizontal 8×vertical 16.

When the Block division unit flag indicates "1", it indicates re-division into block no greater than 8×8. In this case, as to a block of 8×8 in upper left, two bits of 0-th and first bits of the Block type describe re-division type of the block. As to a block of 8×8 in upper right, two bits of second and third bits of the Block type describe re-division type of the block. As to a block of 8×8 in lower right, two bits of 0-th and first bits of the Block type describe re-division type of the block. As to a block of 8×8 in lower right, two bits of second and third bits of the Block type describe re-division type of the block. In each case, when the two bits indicates "00", it describes re-division into 1 block of 8×8, when the two bits indicates "01", it indicates re-division into two sub-blocks of horizontal 8×vertical 4, when the two bits indicate "10", it indicates re-division into two sub-blocks of horizontal 4×vertical 8, and when the two bits indicate "11", it describes re-division into four sub-blocks of horizontal 4×vertical 4.

As to the Bidirectional prediction flag, for a block of 16×16, when the sign of the top 1 bit is "1", it describes bidirectional prediction, and when the sign indicates "0", it describes unidirectional prediction. When there are two blocks of 16×8 or 8×16, top two bits are used for the two blocks, and when the bit indicates "1", it describes bidirectional prediction, and when the bit indicates "0", it describes unidirectional prediction. When there are four blocks of 8×8, four bits are used for the four blocks, and when the bit indicates "1", it describes bidirectional prediction, and when the bit indicates "0", it describes unidirectional prediction.

In order to generate the H.264 coding information format for describing such coding information, and to perform processing for superimposing the coding information onto the plane, having the size of 16×16=256 bits, of LSB of color difference component of the decoded video signal, as shown in FIG. 1, the video decoding apparatus 1 of the present invention shown in FIG. 1 includes a picture decoding unit 10, a macroblock coding data memory 11, an intra-macroblock switch interpretation area generation unit 12, an inter-macroblock switch interpretation area generation unit 13, a switch 14, a macroblock coding information generation unit 15, a slice coding information generation unit 16, a picture coding information generation unit 17, a H.264 coding information format generation unit 18, a baseband video LSB superimposing unit 19 and a frame memory 20.

The picture decoding unit 10 is configured by a H.264 decoder, and is provided with a macroblock decoding unit 100 for decoding the macroblock so that the picture decoding unit 10 decodes a picture from an input data stream.

The macroblock coding data memory 11 stores H.264 coding information that is extracted from decoded information of a macroblock (process target macroblock) decoded by the macroblock decoding unit 100, and that has been used for an H.264 encoder at a former stage to encode the macroblock.

The intra-macroblock switch interpretation area generation unit 12 includes an intra-prediction size value setting unit 120 and a prediction direction setting unit 121. When the process target macroblock is intra-coded, the intra-macroblock switch interpretation area generation unit 12 writes ON ("1") in the before-mentioned macroblock intra-code, and writes corresponding data in the before mentioned Block division unit flag, Block type, Bidirectional prediction flag and the like based on the coding information stored in the macroblock coding data memory 11. While writing these pieces of data, the intra-macroblock switch interpretation area generation unit 12 writes the coding information of the intra-coding into the before-mentioned Switch interpretation area according to the format defined by the data, so that the intra-macroblock switch interpretation area generation unit 12 generates data of the switch interpretation area for intra-macroblock.

The inter-macroblock switch interpretation area generation unit 13 operates in parallel to the intra-macroblock switch interpretation area generation unit 12, and includes an inter-prediction size value setting unit 130, a reference image number setting unit 131, and a motion vector setting unit 132. When the process target macroblock is inter-coded, the inter-macroblock switch interpretation area generation unit 13 writes OFF ("0") in the before-mentioned macroblock intra-code, and writes corresponding data in the before mentioned Block division unit flag, Block type, Bidirectional prediction flag and the like based on the coding information stored in the macroblock coding data memory 11. While writing these pieces of data, the inter-macroblock switch interpretation area generation unit 13 writes the coding information of the inter-coding into the before-mentioned Switch interpretation area according to the format defined by the data, so that the inter-macroblock switch interpretation area generation unit 13 generates data of the switch interpretation area for inter-macroblock.

According to a coding mode (mode indicating intra-coding or inter-coding) obtained from the macroblock coding data memory 11, the switch 14 determines which is proper between the switch interpretation area data generated by the intra-macroblock switch interpretation area generation unit 12 and the switch interpretation area data generated by the inter-macroblock switch interpretation area generation unit 13, so that the switch 14 selects and outputs proper switch interpretation area data.

The macroblock coding information generation unit 15 generates macroblock coding information (described as Mb_rate_information in FIG. 1) based on the switch interpretation area data selected by the switch 14 and based on information specific to the process target macroblock that can be obtained from the macroblock coding data memory 11, wherein the macroblock coding information is a coding information part for the process target macroblock described in the H.264 coding information format shown in FIG. 2.

The slice coding information generation unit 16 obtains slice coding information from decoding information of the process target macroblock, and extracts a part of the slice coding information. According to the extracted slice coding information part, the slice coding information generation unit 16 generates slice coding information (described as Slice_rate_information in FIG. 1) that is to be described in the H.264 coding information format shown in FIG. 2.

The picture coding information generation unit 17 obtains picture coding information from decoding information of the process target macroblock, and extracts a part of the picture coding information. According to the extracted picture coding information part, the picture coding information generation unit 17 generates picture coding information (described as Picture_rate_information in FIG. 1) that is to be described in the H.264 coding information format shown in FIG. 2.

The H.264 coding information format generation unit 18 integrates the macroblock coding information generated by the macroblock coding information generation unit 15, the slice coding information generated by the slice coding information generation unit 16 and the picture coding information generated by the picture coding information generation unit 17 so as to generate the H.264 coding information format shown in FIG. 2.

The baseband video LSB superimposing unit 19 superimposes the H.264 coding information format generated by the H.264 coding information format generation unit 18 onto the plane of LSB of the color difference component of the decoded image of the process target macroblock.

The frame memory 20 stores the macroblock decoded image, on which the H.264 coding information has been superimposed, generated by the baseband video LSB superimposing unit 19, and generates and outputs a decoded video signal on which the H.264 coding information is superimposed.

The video decoding apparatus 1 shown in FIG. 1 can be realized by hardware circuits, and also can be realized by executing a program for realizing each process function units on a computer which is used as the video decoding apparatus. The program can be stored in a recording medium such as a portable memory and the like, and can be installed into a compute from the recording medium.

Figure 3:
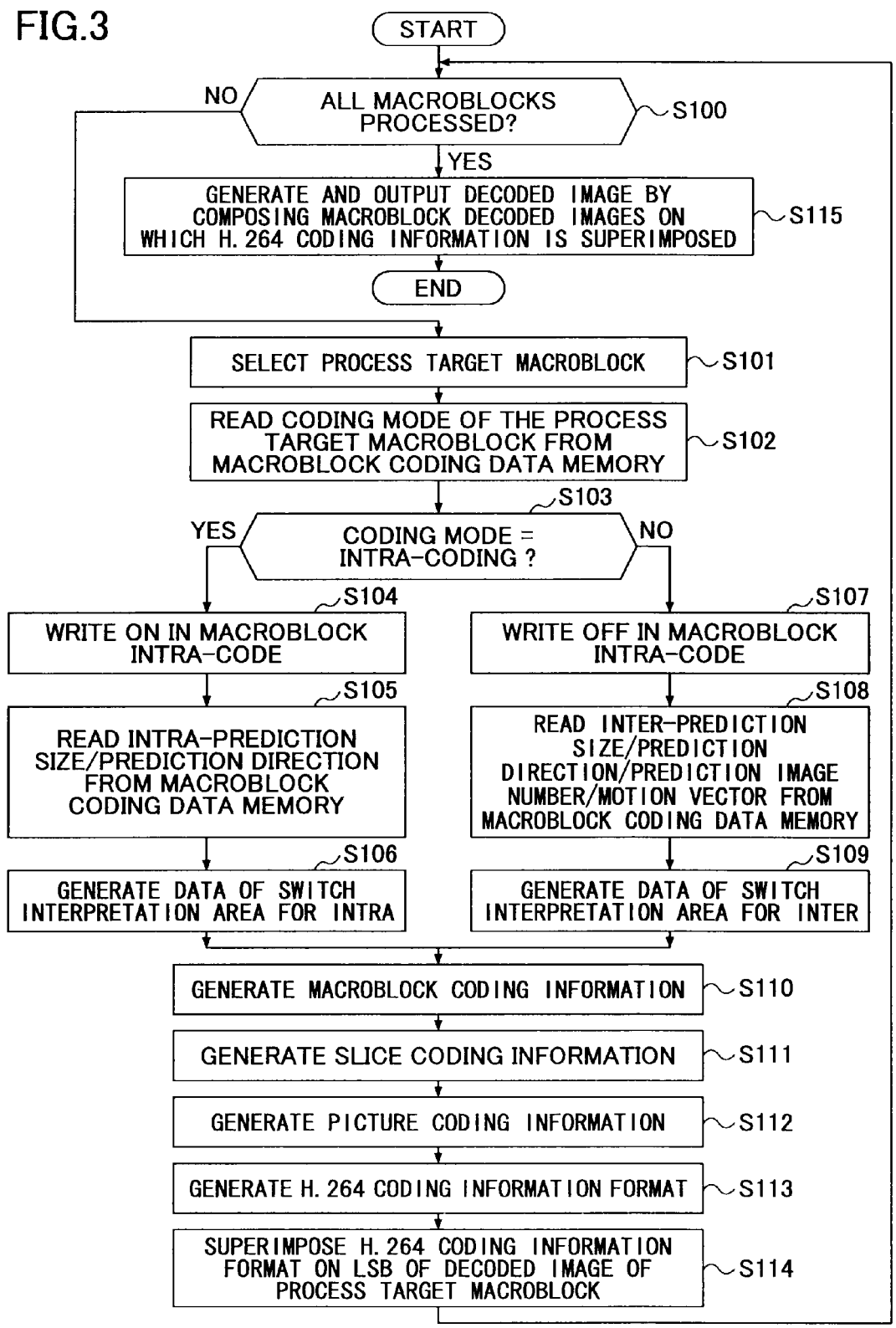
FIG. 3 is a flowchart executed by the video decoding apparatus of the present invention.

FIG. 3 shows a flowchart to be executed by the video decoding apparatus 1 of the present invention in order to superimpose the H.264 coding information format on the decoded video signal.

Next, processing performed by the video decoding apparatus 1 of the present invention configured as shown FIG. 1 is described according to this flowchart.

When entering decoding processing of a decoding target picture, the video decoding apparatus 1 of the present invention determines whether all blocks have been processed in step S100 first as shown in the flowchart of FIG. 3. When it is determined that all macroblocks have not been processed, the process goes to step S101, so that the video decoding apparatus 1 selects a process target macroblock.

Next, in step S102, the video decoding apparatus 1 reads a coding mode of the process target macroblock from the macroblock coding data memory 11. Then, in the following step S103, the video decoding apparatus 1 determines whether the process target macroblock is intra-coded or inter-coded according to the read coding mode.

When it is determined that the process target macroblock is intra-coded in the determination process in step S103, the process goes to step S104, and the video decoding apparatus 1 writes "ON" into the Macroblock intra-code shown in FIG. 2.

Next, in step S105, the video decoding apparatus 1 reads information of the intra-prediction size and prediction direction from the macroblock coding data memory 11. That is, when the process target block is intra-coded, the information of the intra-prediction size and prediction direction is recorded in the H.264 coding information. Thus, the video decoding apparatus 1 reads the information.

Next, in step S106, based on the read information of the intra-prediction size and the prediction direction, the video decoding apparatus 1 generates data of switch interpretation area data for intra.

FIG. 4 shows the switch interpretation area data for intra generated at that time.

As shown in FIG. 4, when the intra-prediction size is 4×4 block, there are 16 intra-prediction directions. Thus, the video decoding apparatus 1 writes "1" indicating 4×4 block prediction into the description area of the Intra type. In addition to that, the video decoding apparatus 1 writes 16 4×4 intra-prediction directions in 16 prepared Intra-prediction modes [0]-[15].

When the intra-prediction size is 8×8 block, there are 4 intra-prediction directions. Thus, the video decoding apparatus 1 writes "2" indicating 8×8 block prediction into the description area of the Intra type. In addition to that, the video decoding apparatus 1 writes 4 8×8 intra-prediction directions into 4 Intra-prediction modes [0]-[3] in 16 prepared Intra-prediction modes [0]-[15].

When the intra-prediction size is 16×16 block, there is 1 intra-prediction direction. Thus, the video decoding apparatus 1 writes "3" indicating 8×8 block prediction into the description area of the Intra type. In addition to that, the video decoding apparatus 1 writes one 16×16 intra-prediction direction into one Intra-prediction mode [0] in 16 prepared Intra-prediction modes [0]-[15].

Accordingly, in the case when the process target macroblock is intra-coded, all of the coding information of the intra-coding can be written in the Switch interpretation area in the H.264 coding information format shown in FIG. 2.

On the other hand, in the determination process in step S103, when it is determined that the process target macroblock is inter-coded, the process goes to step S107, so that the video coding apparatus 1 writes OFF in the Macroblock intra-code shown in FIG. 2.

Next, in step S108, the video decoding apparatus 1 reads, from the macroblock coding data memory 11, inter-prediction size, prediction direction, reference image number and information of motion vectors. That is, when the process target block is inter-coded, since the inter-prediction size, the prediction direction and the information of the motion vectors are recorded in the H.264 coding information, the video decoding apparatus 1 reads these pieces of information.

Next, in step S109, the video decoding apparatus 1 determines the data format of the switch interpretation area according to the read inter-prediction size. Then, the video decoding apparatus 1 writes the read prediction direction, the reference image number and the motion vectors in the switch interpretation area according to the determined data format, so that data of switch interpretation area for inter is generated.

FIG. 5 and FIGS. 6A-6C show data of the switch interpretation area for inter which is generated at this time.

Figure 6A:
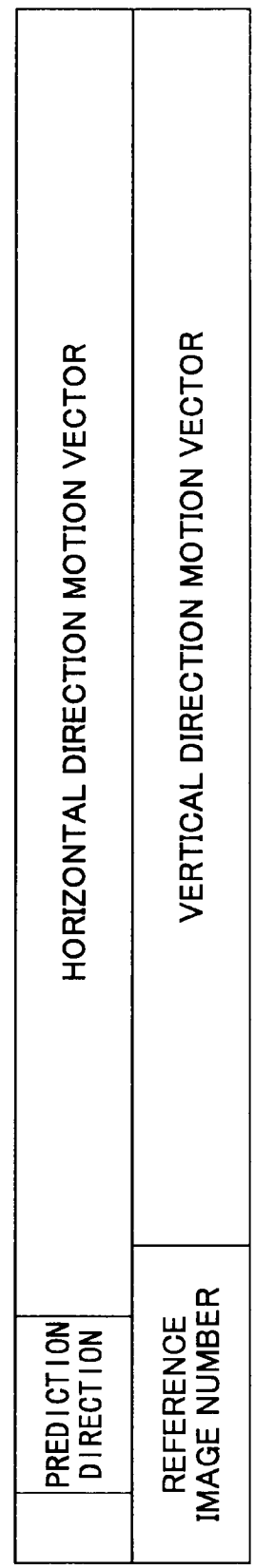
FIG. 6A is an explanatory diagram for explaining the H.264 coding information format generated by the video decoding apparatus of the present invention.

As shown in FIG. 5, in the case of inter-coding by 16×16 block, that is, when "0" is written in the Block division unit flag shown in FIG. 2 and "00" is written in the top two bits of the Block type, and in the case of unidirectional prediction, only a switch interpretation area A is used so that the motion vectors, the reference image number and the prediction direction are written in that area according to the data format shown in FIG. 6A. In the case of bidirectional prediction, only switch interpretation areas A and B are used so that the motion vectors, the reference image number and the prediction direction are written in that area according to the data format shown in FIG. 6A.

In the case of inter-coding by two blocks of horizontal 16×vertical 8 or two blocks of horizontal 8×vertical 16, that is, when "0" is written in the Block division unit flag shown in FIG. 2 and "01" or "10" is written in the top two bits of the Block type, and in the case of unidirectional prediction, only switch interpretation areas A and B are used so that the motion vectors, the reference image number and the prediction direction are written in the area according to the data format shown in FIG. 6A. In the case of bidirectional prediction, switch interpretation areas A, B, C and D are used so that the motion vectors, the reference image number and the prediction direction are written according to the data format shown in FIG. 6A.

In the case of inter-coding by four blocks of horizontal 8×vertical 8, that is, when "1" is written in the Block division unit flag shown in FIG. 2 and "00" is written in the top two bits of the Block type, and in the case of unidirectional prediction, switch interpretation areas A, B, C and D are used so that the motion vectors, the reference image number and the prediction direction are written according to the data format shown in FIG. 6A.

In the case of inter-coding by four blocks of horizontal 8×vertical 8, that is, when "1" is written in the Block division unit flag shown in FIG. 2 and "00" is written in the top two bits of the Block type, and in the case of bidirectional prediction, switch interpretation areas A, B, C and D are used so that the motion vectors, the reference image number and the prediction direction are written in the area according to the data format shown in FIG. 6B. In this case, since the writing area of the motion vectors is small, accurate motion vectors cannot be written. Thus, only 5 bits of the LSB side are written.

In the case of inter-coding by blocks smaller than horizontal 8×vertical 8, that is, when "1" is written in the Block division unit flag shown in FIG. 2 and a value other than "00" is written in the top two bits of the Block type, the number of motion vectors is large. Thus, since the motion vectors cannot be written in the switch interpretation areas A, B, C and D, the reference image number and the prediction direction are written in the switch interpretation areas A, B, C and D according to the data format shown in FIG. 6C.

As mentioned above, in the case of when the process target macroblock is inter-coded, there is a case in which all coding information of inter-coding cannot be written in the Switch interpretation area of the H.264 coding information format shown in FIG. 2. In such a case, coding information of the inter-coding is written in a manner of writing as much as possible.

After generating data of the switch interpretation area for intra in step S106, or after generating data of the switch interpretation area for inter in step S109, next, the video coding apparatus 1 generates macroblock coding information based on the generated data of the switch interpretation area and based on information specific to the process target macroblock that can be obtained from the macroblock coding data memory 11, wherein the macroblock coding information is a coding information part on the process target macroblock that is to be written in the H.264 coding information format shown in FIG. 2.

Next, in step S111, the video decoding apparatus 1 obtains slice coding information from decoding information of the process target macroblock, and extracts a part of the slice coding information. Then, the video decoding apparatus 1 generates slice coding information to be written in the H.264 coding information format shown in FIG. 2 according to the extracted part of the slice coding information.

Next, in step S112, the video decoding apparatus 1 obtains picture coding information from decoding information of the process target macroblock, and extracts a part of the slice coding information. Then, the video decoding apparatus 1 generates picture coding information to be written in the H.264 coding information format shown in FIG. 2 according to the extracted part of the picture coding information.

Next, in step S113, the video decoding apparatus 1 generates the H.264 coding information format shown in FIG. 2 by integrating the generated macroblock coding information, the generated slice coding information and the generated picture coding information.

Next, in step S114, the video decoding apparatus 1 superimposes the generated H.264 coding information format on the LSB plane of the decoded image of the process target macroblock. Then, the process returns to step S100.

Then, while repeating the processes of step S100-step S114, when it is determined that all macroblocks have been processed in step S100, the process goes to step S115. Then, the video decoding apparatus 1 generates a decoded image by composing macroblock decoded images on which the H.264 coding information is superimposed, and outputs the decoded image, so as to generate and output a video signal on which the H.264 coding information is superimposed.

Accordingly, the video decoding apparatus 1 performs processing to transmit coding information of large data amount, which occurs when coding is performed based on H.264, with the decoded video signal by using the Mole format similar to one used in MPEG-2.

INDUSTRIAL APPLICABILITY

The present invention can be applied to a case for recoding a decoded video signal obtained by decoding video coded data which is generated by performing intra-coding and inter-coding, and the present invention realizes transmitting coding information of large data amount, which occurs when coding is performed based on H.264, with the decoded video signal by using the Mole format similar to one used in MPEG-2.

The present international application claims priority based on Japanese patent application No. 2007-219199, filed in the JPO on Aug. 27, 2007 and the entire contents of the Japanese patent application No. 2007-219199 is incorporated herein by reference.

The invention claimed is:

1. A video signal generation apparatus for receiving a bit stream of video coded data generated by intra-coding and inter-coding, and decoding the bit stream in units of blocks each having a specified size to generate a video signal, comprising:

a decoding unit configured to decode the video coded data to obtain a decoded image and coding information for a decoding target block included in the bit stream;

a writing unit configured to write each piece of the coding information at a specified bit position on one bit plane having a size the same as that of the decoding target block according to a coding information format that includes a common area and a switch interpretation area each having a specified bit length and a specified bit position, the common area including a fixed code area for synchronization, a decoding target block cyclic number area, a picture coding information describing area, a slice coding information describing area, a slice type area, a decoding target block intra-code area, a block division unit flag area, and a block type area, each area having a specified bit length, the switch interpretation being an area, having a specified bit length, in which coding information of a data format is written wherein the data format is different according to whether information in the decoding target block intra-code area indicates intra-coding or inter-coding, wherein the writing unit:

writes a fixed code for synchronization having a predetermined value in the fixed code area for synchronization, writes a decoding target block cyclic number indicating a position of the decoding target block on a screen in the decoding target block cyclic number area, writes picture coding information assigned to the decoding target block in the picture coding information describing area, writes slice coding information assigned to the decoding target block in the slice coding information describing area, writes a slice type of the decoding target block in the slice type area, writes a flag value indicating whether the decoding target block has been coded by intra-coding or inter-coding in the decoding target block intra-code area, writes information indicating a block division of the decoding target block in the block division unit flag area and the block type area, and writes coding information of intra-coding or inter-coding in the switch interpretation area where coding information of the intra-coding is written according to a data format conforming to the intra-coding if the decoding target block has been coded by intra-coding, and coding information of the inter-coding is written according to a data format conforming to the inter-coding if the decoding target block has been coded by inter-coding; and a generation unit configured to generate a video signal by superimposing the one bit plane on the decoded image of the decoding target block.

2. The video signal generation apparatus as claimed in claim 1, wherein, when data amount of the coding information becomes large according to the coding division form of the decoding target block so that the coding information cannot be accommodated in the switch interpretation area, the writing unit writes the coding information from which a part of it is omitted into the switch interpretation area according to a data format conforming to the coding division form.

3. The video signal generation apparatus as claimed in claim 1 or 2, wherein the writing unit writes a part of coding information of a picture to which the decoding target block belongs in the common area.

4. A video signal generation method for receiving a bit stream of video coded data generated by intra-coding and inter-coding, and decoding the bit stream in units of blocks each having a specified size to generate a video signal, comprising:

a step of decoding the video coded data to obtain a decoded image and coding information for a decoding target block included in the bit stream;

a step of writing, each piece of the coding information at a specified bit position on one bit plane having a size the same as that of the decoding target block according to a coding information format that includes a common area and a switch interpretation area each having a specified bit length and a specified bit position the common area including a fixed code area for synchronization, a decoding target block cyclic number area, a picture coding information describing area, a slice coding information describing area, a slice type area, a decoding target block intra-code area, a block division unit flag area, and a block type area, each area having a specified bit length, the switch interpretation being an area, having a specified bit length, in which coding information of a data format is written wherein the data format is different according to whether information in the decoding target block intra-code area indicates intra-coding or inter-coding, wherein the writing includes:

writing a fixed code for synchronization having a predetermined value in the fixed code area for synchronization, writing a decoding target block cyclic number indicating a position of the decoding target block on a screen in the decoding target block cyclic number area, writing picture coding information assigned to the decoding target block in the picture coding information describing area, writing slice coding information assigned to the decoding target block in the slice coding information describing area, writing a slice type of the decoding target block in the slice type area, writing a flag value indicating whether the decoding target block has been coded by intra-coding or inter-coding in the decoding target block intra-code area, writing information indicating a block division of the decoding target block in the block division unit flag area and the block type area, and writing coding information of intra-coding or inter-coding in the switch interpretation area where coding information of the intra-coding is written according to a data format conforming to the intra-coding if the decoding target block has been coded by intra-coding, and coding information of the inter-coding is written according to a data format conforming to the inter-coding if the decoding target block has been coded by inter-coding; and a step of generating a video signal by superimposing the one bit plane on the decoded image of the decoding target block.

5. The video signal generation method as claimed in claim 4, wherein, when data amount of the coding information becomes large according to the coding division form of the decoding target block so that the coding information cannot be accommodated in the switch interpretation area, the step of writing comprises writing the coding information from which a part of it is omitted into the switch interpretation area according to a data format conforming to the coding division form.

6. The video signal generation method as claimed in claim 4 or 5, wherein the step of writing comprises writing a part of coding information of a picture to which the decoding target block belongs in the common area.

7. A non-transitory computer readable recording medium recording a video signal generation program causing a computer which is used as a video signal generation apparatus for receiving a bit stream of video coded data generated by intra-coding and inter-coding, and decoding the bit stream in units of blocks each having a specified size to generate a video signal, to function as:

a decoding unit configured to decode the video coded data to obtain a decoded image and coding information for a decoding target block included in the bit stream;

a writing unit configured to write each piece of the coding information at a specified bit position on one bit plane having a size the same as that of the decoding target block according to a coding information format that includes a common area and a switch interpretation area each having a specified bit length and a specified bit position, the common area including a fixed code area for synchronization, a decoding target block cyclic number area, a picture coding information describing area, a slice coding information describing area, a slice type area, a decoding target block intra-code area, a block division unit flag area, and a block type area, each area having a specified bit length, the switch interpretation being an area, having a specified bit length, in which coding information of a data format is written wherein the data format is different according to whether information in the decoding target block intra-code area indicates intra-coding or inter-coding, wherein the writing unit:
  writes a fixed code for synchronization having a predetermined value in the fixed code area for synchronization,
  writes a decoding target block cyclic number indicating a position of the decoding target block on a screen in the decoding target block cyclic number area,
  writes picture coding information assigned to the decoding target block in the picture coding information describing area,
  writes slice coding information assigned to the decoding target block in the slice coding information describing area,
  writes a slice type of the decoding target block in the slice type area,
  writes a flag value indicating whether the decoding target block has been coded by intra-coding or inter-coding in the decoding target block intra-code area,
  writes information indicating a block division of the decoding target block in the block division unit flag area and the block type area, and
  writes coding information of intra-coding or inter-coding in the switch interpretation area where coding information of the intra-coding is written according to a data format conforming to the intra-coding if the decoding target block has been coded by intra-coding, and coding information of the inter-coding is written according to a data format conforming to the inter-coding if the decoding target block has been coded by inter-coding; and a generation unit configured to generate a video signal by superimposing the one bit plane on the decoded image of the decoding target block.

8. The non-transitory computer readable recording medium recording the video signal generation program as claimed in claim 7, wherein, when data amount of the coding information becomes large according to the coding division form of the decoding target block so that the coding information cannot be accommodated in the switch interpretation area, the writing unit writes the coding information from which a part of it is omitted into the switch interpretation area according to a data format conforming to the coding division form.

9. The non-transitory computer readable recording medium recording the video signal generation program as claimed in claim 7 or 8, wherein the writing unit writes a part of coding information of a picture to which the decoding target block belongs in the common area.

10. A video signal generation apparatus for receiving a bit stream of video coded data generated by intra-coding and inter-coding, and decoding the bit stream in units of blocks each having a specified size to generate a video signal, comprising:

a decoding unit configured to decode the video coded data to obtain a decoded image and coding information for a decoding target block included in the bit stream;

a writing unit configured to write each piece of the coding information at a specified bit position on one bit plane having a size the same as that of the decoding target block according to a coding information format that includes a common area and a switch interpretation area each having a specified bit length and a specified bit position, the common area including a fixed code area for synchronization, a decoding target block cyclic number area, a picture coding information describing area, a slice coding information describing area, a slice type area, a decoding target block intra-code area, a block division unit flag area, a block type area, and a bidirectional prediction flag area, each area having a specified bit length, the switch interpretation being an area, having a specified bit length, in which coding information of a data format is written wherein the data format is different according to whether information in the decoding target block intra-code area indicates intra-coding or inter-coding, wherein the writing unit:
  writes a fixed code for synchronization having a predetermined value in the fixed code area for synchronization, writes a decoding target block cyclic number indicating a position of the decoding target block on a screen in the decoding target block cyclic number area, writes picture coding information assigned to the decoding target block in the picture coding information describing area, writes slice coding information assigned to the decoding target block in the slice coding information describing area, writes a slice type of the decoding target block in the slice type area, writes a flag value indicating whether the decoding target block has been coded by intra-coding or inter-coding in the decoding target block intra-code area, writes information indicating a block division of the decoding target block in the block division unit flag area and the block type area, writes information, in the bidirectional prediction flag area, indicating whether coding is performed by bidirectional prediction or unidirectional prediction for the decoding target block or a sub-block of the decoding target block, and writes coding information of intra-coding or inter-coding in the switch interpretation area where coding information of the intra-coding is written according to a data format conforming to the intra-coding if the decoding target block has been coded by intra-coding, and coding information of the inter-coding is written according to a data format conforming to the inter-coding if the decoding target block has been coded by inter-coding; and a generation unit configured to generate a video signal by superimposing the one bit plane on the decoded image of the decoding target block.

11. A video signal generation method for receiving a bit stream of video coded data generated by intra-coding and inter-coding, and decoding the bit stream in units of blocks each having a specified size to generate a video signal, comprising:

a step of decoding the video coded data to obtain a decoded image and coding information for a decoding target block included in the bit stream;

a step of writing each piece of the coding information at a specified bit position on one bit plane having a size the same as that of the decoding target block according to a coding information format that includes a common area and a switch interpretation area each having a specified bit length and a specified bit position, the common area including a fixed code area for synchronization, a decoding target block cyclic number area, a picture coding information describing area, a slice coding information describing area, a slice type area, a decoding target block intra-code area, a block division unit flag area, a block type area, and a bidirectional prediction flag area, each area having a specified bit length, the switch interpretation being an area, having a specified bit length, in which coding information of a data format is written wherein the data format is different according to whether information in the decoding target block intra-code area indicates intra-coding or inter-coding, wherein the writing includes writing a fixed code for synchronization having a predetermined value in the fixed code area for synchronization, writing a decoding target block cyclic number indicating a position of the decoding target block on a screen in the decoding target block cyclic number area, writing picture coding information assigned to the decoding target block in the picture coding information describing area, writing slice coding information assigned to the decoding target block in the slice coding information describing area, writing a slice type of the decoding target block in the slice type area, writing a flag value indicating whether the decoding target block has been coded by intra-coding or inter-coding in the decoding target block intra-code area, writing information indicating a block division of the decoding target block in the block division unit flag area and the block type area, writing information, in the bidirectional prediction flag area, indicating whether coding is performed by bidirectional prediction or unidirectional prediction for the decoding target block or a sub-block of the decoding target block, and writing coding information of intra-coding or inter-coding in the switch interpretation area where coding information of the intra-coding is written according to a data format conforming to the intra-coding if the decoding target block has been coded by intra-coding, and coding information of the inter-coding is written according to a data format conforming to the inter-coding if the decoding target block has been coded by inter-coding; and a step of generating a video signal by superimposing the one bit plane on the decoded image of the decoding target block.

12. A non-transitory computer readable recording medium recording a video signal generation program causing a computer which is used as a video signal generation apparatus for receiving a bit stream of video coded data generated by intra-coding and inter-coding, and decoding the bit stream in units of blocks each having a specified size to generate a video signal, to function as:

a decoding unit configured to decode the video coded data to obtain a decoded image and coding information for a decoding target block included in the bit stream;

a writing unit configured to write each piece of the coding information at a specified bit position on one bit plane having a size the same as that of the decoding target block according to a coding information format that includes a common area and a switch interpretation area each having a specified bit length and a specified bit position, the common area including a fixed code area for synchronization, a decoding target block cyclic number area, a picture coding information describing area, a slice coding information describing area, a slice type area, a decoding target block intra-code area, a block division unit flag area, a block type area, and a bidirectional prediction flag area, each area having a specified bit length, the switch interpretation being an area, having a specified bit length, in which coding information of a data format is written wherein the data format is different according to whether information in the decoding target block intra-code area indicates intra-coding or inter-coding, wherein the writing unit:
  writes a fixed code for synchronization having a predetermined value in the fixed code area for synchronization,
  writes a decoding target block cyclic number indicating a position of the decoding target block on a screen in the decoding target block cyclic number area,
  writes picture coding information assigned to the decoding target block in the picture coding information describing area,
  writes slice coding information assigned to the decoding target block in the slice coding information describing area,
  writes a slice type of the decoding target block in the slice type area,
  writes a flag value indicating whether the decoding target block has been coded by intra-coding or inter-coding in the decoding target block intra-code area,
  writes information indicating a block division of the decoding target block in the block division unit flag area and the block type area,
  writes information, in the bidirectional prediction flag area, indicating whether coding is performed by bidirectional prediction or unidirectional prediction for the decoding target block or a sub-block of the decoding target block, and
  writes coding information of intra-coding or inter-coding in the switch interpretation area where coding information of the intra-coding is written according to a data format conforming to the intra-coding if the decoding target block has been coded by intra-coding, and coding information of the inter-coding is written according to a data format conforming to the inter-coding if the decoding target block has been coded by inter-coding; and
a generation unit configured to generate a video signal by superimposing the one bit plane on the decoded image of the decoding target block.

* * * * *